United States Patent
Mory et al.

(10) Patent No.: US 7,844,126 B2
(45) Date of Patent: Nov. 30, 2010

(54) MULTI-FEATURE TIME FILTERING FOR ENHANCING STRUCTURES IN NOISY IMAGES

(75) Inventors: Benoit Mory, Paris (FR); Raoul Florent, Ville d'Avray (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 859 days.

(21) Appl. No.: 11/720,106

(22) PCT Filed: Nov. 21, 2005

(86) PCT No.: PCT/IB2005/053831

§ 371 (c)(1),
(2), (4) Date: May 24, 2007

(87) PCT Pub. No.: WO2006/056924

PCT Pub. Date: Jun. 1, 2006

(65) Prior Publication Data

US 2008/0199097 A1      Aug. 21, 2008

(30) Foreign Application Priority Data

Nov. 24, 2004   (EP) ................................. 04300809

(51) Int. Cl.
G06K 9/40 (2006.01)
G06K 9/36 (2006.01)
G06K 9/20 (2006.01)
(52) U.S. Cl. .................... 382/254; 382/284; 382/294
(58) Field of Classification Search ............ None
See application file for complete search history.

(56) References Cited

U.S. PATENT DOCUMENTS 6,094,467 A    7/2000   Gayer et al.
6,125,193 A    9/2000   Han (Continued)

FOREIGN PATENT DOCUMENTS

WO      03045263 A2    6/2003

(Continued)

OTHER PUBLICATIONS

Close, R. A., et al.; Improved Image Guidance of Coronary Stent Deployment; 2000; Proc. Of EPIE; vol. 3976; pp. 301-304.

(Continued)

*Primary Examiner*—Charles Kim

(57) ABSTRACT

A method for enhancing objects of interest represented on a moving background in a sequence of noisy images, and for displaying the sequence of enhanced images, the method comprising the steps of acquiring the sequence of images, extracting features related to an object of interest on a background in images from the sequence of acquired images or processed images, said features comprising at least two separately identified parts, registering separately each identified part with respect to an image from the sequence of acquired images, while not registering the background around said identified parts, to generate registered images of said identified parts, assembling together all registered identified parts from said object of interest using a weighted combination of said registered identified parts, to generate assembled images, integrating both said object of interest and said background over at least one assembled image and one acquired image, and displaying the processed images of the enhanced object of interest on faded background.

14 Claims, 5 Drawing Sheets

U.S. PATENT DOCUMENTS

| | | | |
|---|---|---|---|
| 6,332,035 B1 | 12/2001 | Basu et al. | |
| 6,385,349 B1 * | 5/2002 | Teo | 382/284 |
| 6,411,670 B1 | 6/2002 | Besson | |
| 6,532,380 B1 | 3/2003 | Close et al. | |
| 6,823,078 B1 | 11/2004 | Florent et al. | |

FOREIGN PATENT DOCUMENTS

| | | |
|---|---|---|
| WO | 03049032 A2 | 6/2003 |
| WO | 2004044847 A1 | 5/2004 |
| WO | 2004051572 A2 | 6/2004 |

OTHER PUBLICATIONS

Close, R. A., et al.; Accuracy Assessment of Layer Decomposition Using Simulated Angiographic Image Sequences; 2001; IEEE Trans. on Medical Imaging; 20(10)990-998.

* cited by examiner

MULTI-FEATURE TIME FILTERING FOR ENHANCING STRUCTURES IN NOISY IMAGES

The invention relates to a viewing system for enhancing moving objects of interest represented in a sequence of noisy images, to a computer-executable image processing method to be used in said system and to a medical examination apparatus incorporating such a system. The invention finds for example its application in the medical field of cardiology, for enhancing thin objects of interest such as stents and vessel walls in angiograms.

A stent is an endovascular prosthesis, usually made of stainless steel or alloy, that is placed in the artery in order to improve blood circulation in regions where stenosis has appeared. When a narrowing called stenosis is identified in a coronary artery of a patient, a procedure called angioplasty may be prescribed to improve blood flow to the heart muscle by opening the blockage. In recent years, angioplasty increasingly employs a stent implantation technique. This stent implantation technique includes an operation of stent placement at the location of the detected stenosis in order to efficiently hold open the diseased vessel. The stent is wrapped tightly around a balloon attached to a monorail introduced by way of a catheter and a guidewire. Once in place, the balloon is inflated in order to expand the stent. Once expanded, the stent, which can be considered as a permanent implant, acts like a spacer keeping the artery wall open.

The artery, the balloon, the stent, the monorail and the thin guide-wire are observed in noisy fluoroscopic images. Fluoroscopy is a low dose x-rays technique that yields very noisy and low-contrasted images. Image sequences are formed of badly contrasted medical images, where medical instruments as well as vessel walls are hardly distinguishable on a noisy background. These objects show low radiographic contrast that makes evaluation of the placement and expansion of the stents at an accurate location very difficult. Also, during the operation of stent implantation, the monorail, with the balloon and stent wrapped around it, is moving with respect to the artery, the artery is moving under the influence of the cardiac pulses, and it is seen on a background that is moving under the influence of the patient's breathing. These movements make the following of stent implantation under fluoroscopic imaging still more difficult to visualize, on top of the noisy background. Introducing a catheter in a patient artery in these conditions is a very delicate and dangerous operation.

Contrast agents that are needed in some available balloon deployment procedures make the task of the clinician even harder when distinguishing the stent from the balloon and the wall of the artery.

Having precise images of the ongoing procedure (i.e. in real time) is of the utmost importance to the clinician indeed as severe clinical problems can be associated with inadequate expansion or improper placement of the stent, and gap or overlap between several stents. Improperly deployed stents can cause thrombosis.

The so-called layer decomposition technique, used to improve the visualization, comprises decomposing a sequence of images over different layers using a phase correlation technique, which leads to a separate estimation of the vessels motion and the background motion. The background motion is then subtracted from the original image. The calculation load is nonetheless heavy, which makes the technique impractical to be used during an intervention.

Another technique directly usable during an intervention has been described in WO 03/045263 A2. This document discloses a viewing system for improving the detection of low-contrast features such as stents in coronary x-ray images or angiograms, while minimizing noise and fading the background in noisy images, such as a sequence of medical fluoroscopic images.

In this improved technique, only the motion of the object of interest is estimated. After an initialization phase to extract and localize an object of interest in a region of interest (ROI), this object is systematically registered with respect to the reference frame of the sequence of images while the background is not. Both the initialization and the registration phases use markers set on the stent and/or its introduction apparatus. A temporal integration technique is performed on at least two images where the object of interest has been registered. Since after registration of the object, the background still moves with respect to the reference frame of the images, and still includes noises, this temporal integration technique provides an enhancement of the object of interest, while blurring any structure which might appear in the background. This approach also comprises an enhancing step using an edge filter to extract the sharp details of the object of interest.

It is an object of the present invention to provide an improved viewing system and image processing method which overcomes the above-mentioned difficulties.

Accordingly, the present invention provides an apparatus according to claim 1, a method according to claim 13 and a computer program product according to claim 14.

The invention takes advantage of the known improved visualization technique disclosed in WO 03/045263 A2 and applies it individually to smaller parts forming the object of interest. The different enhanced features related to each part are then reassembled together using a weighted sum of the different features. A temporal integration can be performed using at least one assembled image and one image from the acquired sequence. Dividing the object into smaller parts, and using a weighted sum of each individually processed smaller part, lead to improved images with blurred background and reduced noises available to the clinician when performing the medical intervention.

Other features and advantages of this invention will further appear in the hereafter description when considered in connection to the accompanying drawings, wherein.

Figure 1A:
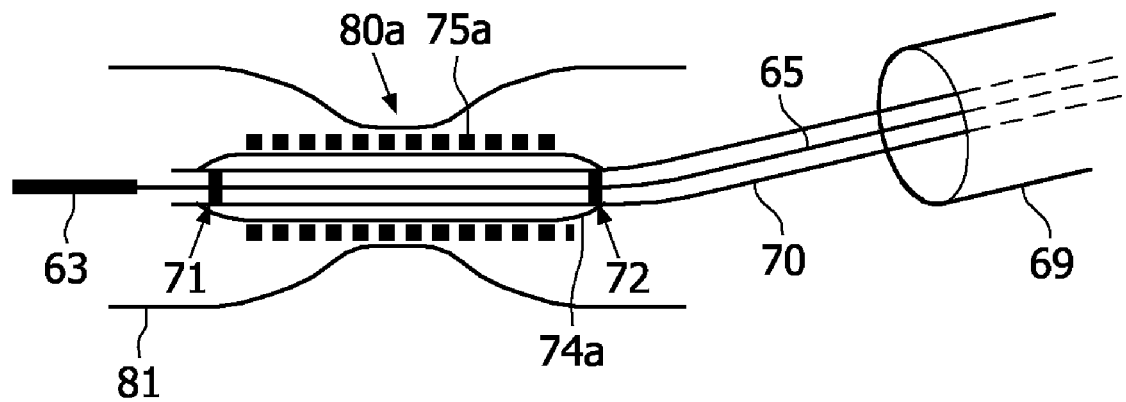
FIGS. 1A and 1B illustrate an angioplasty intervention.

The present invention deals with the enhancement of objects of interest in a sequence of noisy images. Although the implementation of the invention illustrated herein is based on software, it may also be implemented with a hardware component in, for example, a graphics card in a medical application computer system Referring now to the drawings, and more particularly to FIGS. 1A and 1B thereof, a one-phase angioplasty intervention is diagrammatically illustrated.

In a preliminary step (not shown), the practitioner localizes the stenosis 80$a$, in the form of a narrow lumen, in a patient's artery 81. FIG. 1A displays the introduction of a monorail 70 with a balloon 74$a$ wrapped around its extremity, using the catheter 69 and the thin guide-wire 65, with a stent 75$a$ wrapped around said balloon 74a. The balloon 74a is positioned with the stent at the location of the stenosis in the previously localized lumen 80a of the artery 81.

Figure 1B:
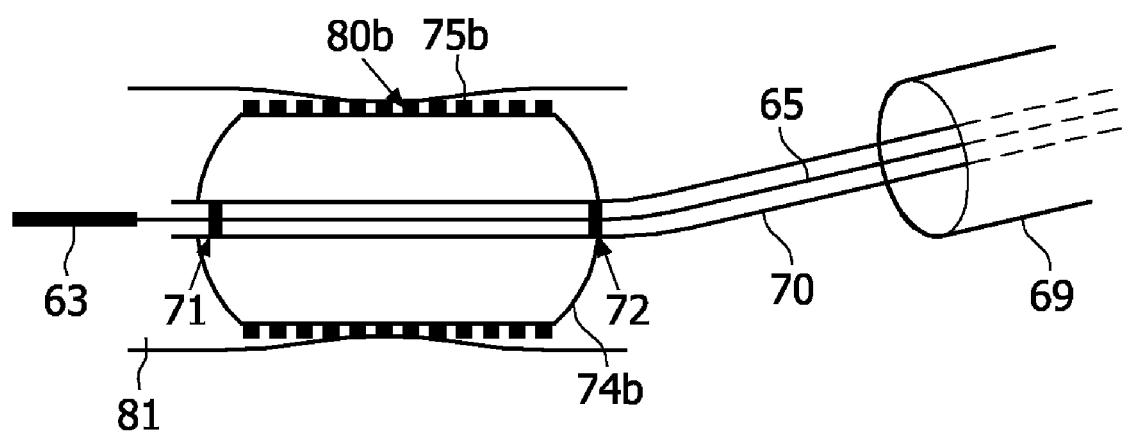

Following the introduction of the monorail, FIG. 1B displays the inflation of the balloon 74b in order to expand the lumen 80a into an enlarged lumen 80b. The inflation of the balloon also provides a plastic deformation of the stent 75b which is then embedded in the artery wall in order to keep the lumen enlarged. The intervention continues with the removing of the balloon 74b, the monorail 70, the guide-wire 65 and catheter 69.

The angioplasty intervention can consist also of two phases, the first phase consisting solely of the introduction of a first balloon carrying no stent, in order to expand the lumen 80a. The second phase is similar the one-phase angioplasty described here before.

Figure 2A:
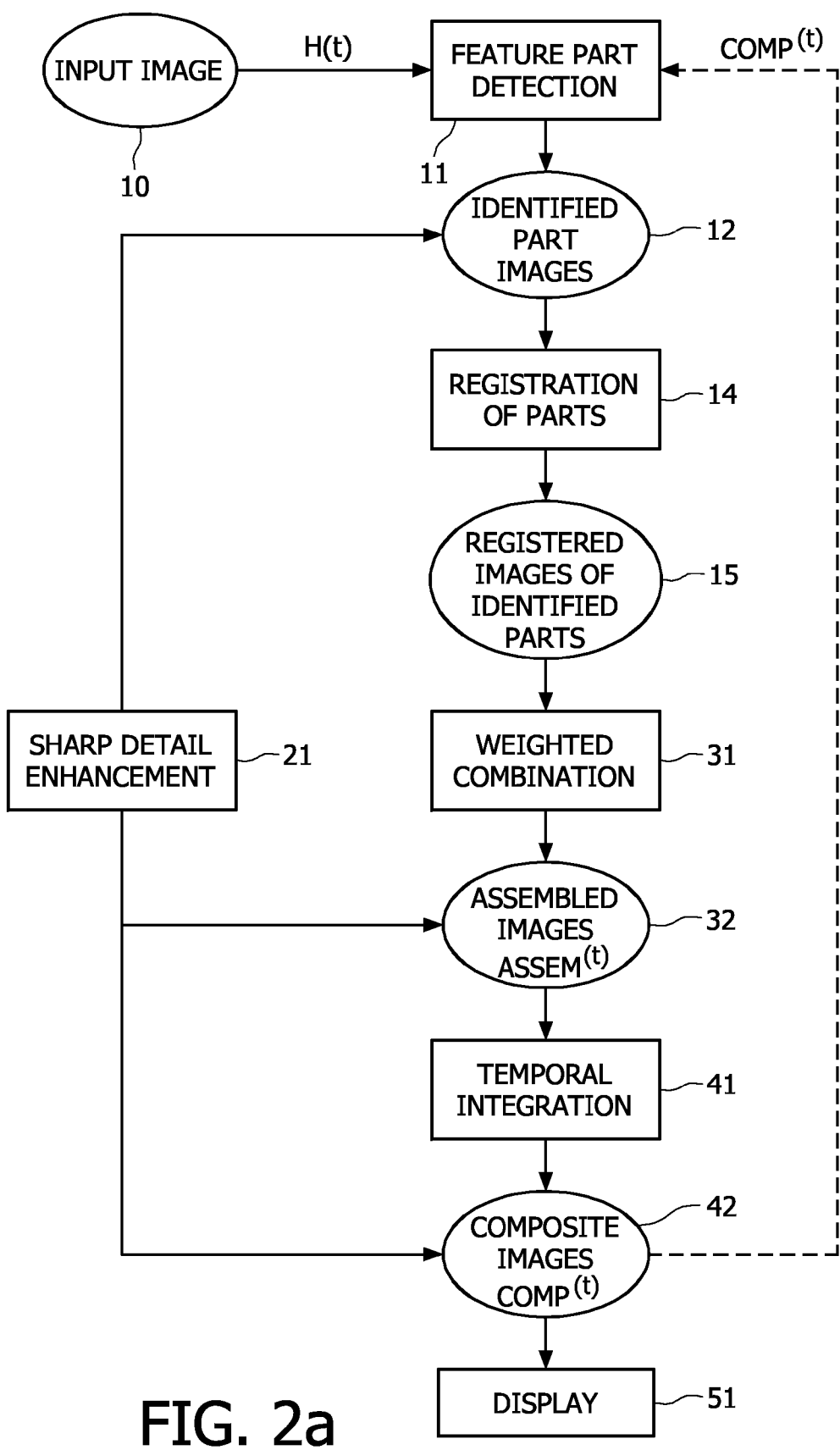
FIGS. 2A and 2B are functional block diagrams of a system according to the invention.

Referring now to FIG. 2A, a flow chart of an exemplary method to enhance objects of interest in a sequence of noisy images is shown. The overall scheme includes an initial acquisition in step 10 of a digital medical 2D or 3D image, also called input or acquired image, depicting the object to be enhanced. That step may include the use of a file converter component to convert images from one file format to another if necessary. The resulting input image is called M(p) or M hereafter, p being a pixel index within the image. In the following, an image and its data will be referred to by the same name; hence M both refers to the input image and the input data for pixel p. All the input images M form a sequence of images that contains the objects to be enhanced. When the time t of acquisition is implied, M is referred to as $M^{(t)}$ hereafter. A common reference frame may be defined over all input images M, in order to localize moving objects and background.

In a second step 11, the input image is processed to extract and localize the object of interest through different feature parts. The object usually moves with respect to the reference frame of the image, but this is not a requirement. The background itself can move both with respect to said reference frame and with respect to the object. As mentioned before, the images can also be noisy due to the low contrast, and the hardly radio-opaque objects.

The extraction and localization of the feature parts may be performed directly on the object (through an edge-detected image, created using techniques known in the art, such as the local variance method or the gradient intensity method). Referring to FIGS. 1A and 1B, the object of interest in this example may be the site of the intervention, i.e. the vessel with the lumen, and the different feature parts may be the balloon 74a and 74b, the stent 75a and 75b, the guide-wire 63, and the monorail 70.

However, as the objects are hardly radio-opaque, they are preferably localized indirectly. According to the invention, the objects are localized by first localizing related landmarks.

Referring to FIGS. 1A and 1B, the indirect localization of the feature parts of step 11 may be performed by localizing first specific landmarks such as the guide-wire tip 63 or the balloon-markers 71,72. The marker 63, which is located at the extremity of the thin guide-wire 65, allows to determine the position of the guide-wire 65 with respect to the stenosed zone 80a of the artery 81. The balloon-markers 71, 72, which are located on the monorail 70 at given positions with respect to the balloon 74a, permit the determination of the position of the second balloon, with the stent 75a wrapped around it, before stent expansion. They also permit a final check of the expanded stent 75b.

These specific landmarks called tips or markers are far better contrasted than the stent or vessel walls. The feature parts extraction of step 11 is appropriate to accurately extract said tips or markers from the original images M. However, the clinician may choose to select the tips and markers manually or to improve manually the detection of their coordinates. These tips and markers have a specific easily recognizable shape, and are made of a material highly contrasted in the images. Hence they are easy to extract. It is to be noted that these specific features do not belong to the poorly contrasted stent or vessel walls, which are the objects that are finally of interest for the practitioner. The localization through markers further permits to accurately derive the location of other parts such as the balloons 74a and 74b. Indeed, the balloon-markers have a specific location with respect to the balloons. Also, the stents 75a, 75b are accurately localized, since the stents have a specific location with respect to the balloon-markers though said stents are not attached to said balloon-markers.

More generally, the clinician may choose any visible landmarks. The landmarks can be markers added to the medical instruments (balloon-markers 71 and 72), or parts of the instruments (guide-wire tip 63), or any visible landmark that he/she may find relevant to localize (the whole guide-wire, the balloons . . . ).

As mentioned earlier, the object of interest may be moving with respect to the reference frame, and its movement may be more complex than just a translation or rotation. It can be deformed in the course of the medical intervention, or its parts can move with regard to each other. Different feature parts result in different motions. Therefore, it is interesting to detect and identify feature parts that are related to separate parts (at least two separately identified parts), to follow the movement and deformation of each of these feature parts individually. Step 11 then yields identified parts images 12 from the input image M.

Once the feature parts of an object of interest has been extracted, each separately identified part is registered with respect to another input image of the sequence, in a following step 14, in order to yield registered images 15 of said identified parts.

Figure 3:
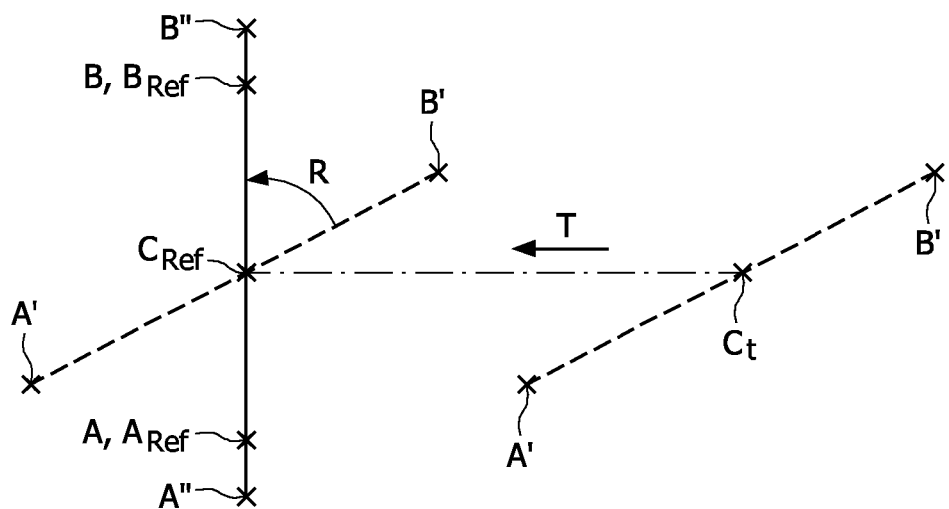
FIG. 3 illustrates a step of landmark registration in relation to one identified feature part in a moving object.

Referring to FIG. 3, when the extraction is performed indirectly, for instance two landmarks $A_{Ref}$, $B_{Ref}$ have been detected in an image of the sequence, called image of reference. These two landmarks are related to an identified part n. The landmarks $A_{Ref}$, $B_{Ref}$ may be selected by automatic means. Then, the registration step 14 of the method according to the invention, uses the landmark location information of $A_{Ref}$ and $B_{Ref}$ in the reference image and corresponding extracted landmarks A' and B' in a second image of the sequence (and related to the same identified part n), to automatically register the identified part in the second image onto that same part in the reference image. This geometrical operation is performed around the centroid of the identified part by matching the landmarks of the current image to the corresponding landmarks of the reference image. This operation comprises possible geometrical transformations including:

a translation T to match a centroid $C_t$ of the segment A' B' of the second image with a centroid $C_{Ref}$ of the segment $A_{Ref} B_{Ref}$ of the reference image;

a rotation R to match the direction of the segment A' B' of the second image with the direction of the segment $A_{Ref} B_{Ref}$ of the reference image, resulting in a segment A"B"; and, a dilation A for matching the length of the resulting segment A" B" with the length of the segment $A_{Ref} B_{Ref}$ of the reference image, resulting in the segment A B, that matches segment $A_{Ref} B_{Ref}$.

Such transformations of translation T, rotation R and dilation A are defined between an image at a given instant of the sequence and an image of reference, and allow to synchronize the same identified part n, over these two images. Coherence has thus been generated over the identified part n. During the registration step of one identified part n, applying the same transformations to the other parts as well as to the background will result in further getting them out of synchronization. When superimposing the registered image and the reference image, the corresponding identified part n is enhanced thanks to the generated coherence, while the other parts and the background, as well as the noise, are blurred, due to the absence of coherence between these elements.

The reference image may be the same for all registrations, for example the first acquired image of the sequence, and the second image is then the current image at instant t. In a preferred embodiment, the reference image varies and is chosen as the current image at instant t. The second image is chose as the image preceding the current image, i.e. the image at t−1. This image is thus "warped" into the current image, after all separately identified parts have been extracted from both images, as explained in step 11. The results of this part by part registration are registered images $REGIST_n^{(t-1)}$, for each identified part n on the image at t−1. Thus there are as many sequences of warped images as there are separately identified parts, i.e. $REGIST_n^{(t-1)}$, n∈[1, N], N being the total number of identified parts.

This operation of registration is not necessarily performed on all the points of an identified part. This operation of registration minimizes the effect of respective movements of the objects of interest, such as vessels, guide-wire, balloons and stent. Preferably, two markers, or more, are used for better registration.

Figure 4:
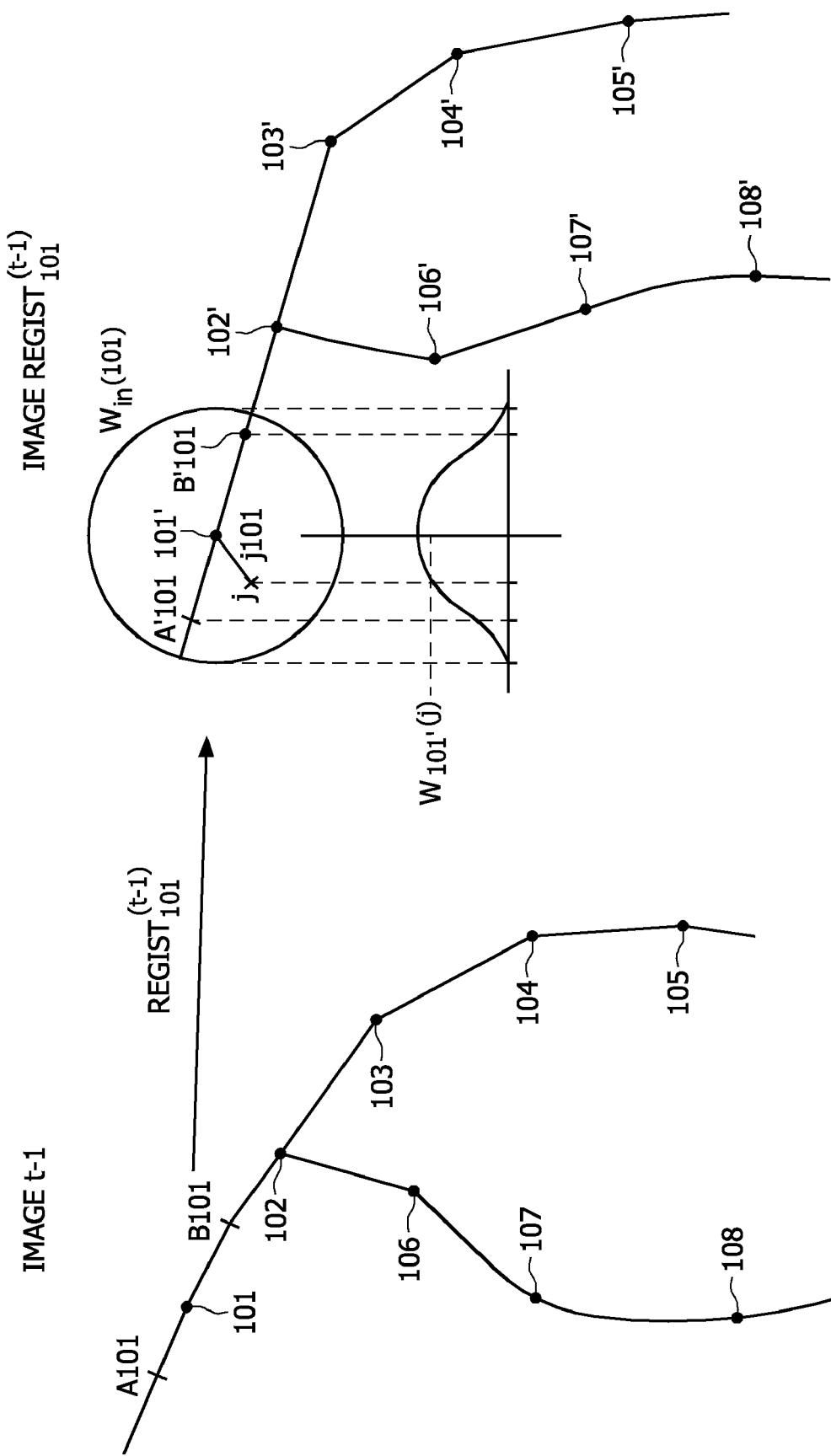
FIG. 4 illustrates a step of one landmark registration in relation to several identified feature parts in a moving object, and the weighting of the registered image; and, FIG. 5 is a schematic illustration of a general-purpose computer programmed according to the teachings of the present invention.

In a following step 31, the registered identified parts are assembled into assembled images $ASSEM^{(t)}$ using a weighted combination of said registered identified parts. FIG. 4 is a schematic illustration of a landmark registration in relation to several identified parts, as well as the weighting of the registered part. The moving object is illustrated by the identified part centroids C, here numbered 101 to 108 on the left hand-side image taken at t−1. Eight parts have been identified, the first one being represented by segment $A_{101}$ $B_{101}$ and its centroid 101. On the right hand-side of FIG. 4, the registered image $REGIST_{101}^{(t-1)}$ is represented and corresponds to the registration of the first identified part onto its new position in the image $M^{(t)}$ taken at t (the current image, not represented). The first part is represented by segment $A'_{101}$ $B'_{101}$ and its centroid 101', that corresponds roughly to its position in $M^{(t)}$. As this image is the result of step 14 performed on this first identified part only, the other centroids and identified parts are in new positions 102' to 108', and do not necessarily match their actual position in $M^{(t)}$.

After registration of all identified parts, a weighting operation using a filter kernel is performed around each identified part centroid, on the corresponding registered image $REGIST_n^{(t-1)}$, as illustrated in FIG. 4 around centroid 101' in $REGIST_{101}^{(t-1)}$. To calculate an assembled image from all registered images $REGIST_n^{(t-1)}$ (for each identified part n on the image at t−1), a window $win(C_n)$ is first defined around the pixel $C_n$ related to the centroid of each part, here centroid 101' (here the window is circular and centroid 101' is its center). Furthermore, weighting coefficients are defined through an isotropic spatial distribution $W_{Cn}(j)$ defined for all pixels j inside $win(C_n)$. The spatial distribution is maximum at $C_n$, and identical for all j pixels belonging to a circle centered on $C_n$. For pixels j outside $win(C_n)$, the spatial distribution is nil. The window size of win(C) is a function of the parameters chosen for the filter kernel as well as the identified parts dimensions. The window $win(C_n)$ is preferably larger than the identified part dimensions. The use of $win(C_n)$ allows to focus on the identified part n, while erasing the rest of the registered image $REGIST_n^{(t-1)}$. In the example of FIG. 4, the resulting weighting operation of $REGIST_{101}^{(t-1)}$ in win(101') would lead to an image with non zero pixel data in win(101').

The assembled image $ASSEM^{(t-1)}$ is then the result of the normalized sum, or weighting combination, here below:

$$ASSEM^{(t-1)}(j) = \frac{\sum_{n \in [1,N]} W_{Cn}(j) \cdot REGIST_n^{(t-1)}(j)}{\sum_{n \in [1,N]} W_{Cn}(j)} \quad (1)$$

N being the number of identified parts.

each $W_{Cn}(j)$ function decays steadily with distance $r_j^n$, measured from the centroid $C_n$ to a pixel j of $win(C_n)$, and is nil beyond $win(C_n)$. The spatial distribution can be chosen for example as a Gaussian law $\exp[-(r_j^n)^2/\sigma^2]$. All assembled images form a sequence of assembled images, wherein most of the background has been erased, thanks to the use of the filter kernel. In $ASSEM^{(t-1)}$, the different identified parts are all synchronized respectively with the same identified parts in $M^{(t)}$.

In FIG. 4, $win(C_n)$ is shown as a circle, but can actually be of any shape. In preferred embodiment, $win(C_n)$ is an ellipse, centered on $C_n$, and with its main axis parallel or orthogonal to the main feature direction at $C_n$, and the second axis orthogonal to the main one on $C_n$. The spatial distribution is then defined according to the window shape, i.e. in the example of a Gaussian distribution over an ellipsoidal window, the ellipsoidal coordinates are then used.

One key aspect of the invention lies in the fact that the assembled image $ASSEM^{(t-1)}$ actually allows to merge several warped images data per pixel of the initial image. Indeed, neighboring windows $win(C_n)$ attached to several proximate centroids can actually overlap (due to the window size, the features curves, . . . ). When looking at a pixel q belonging to this overlapping region, especially when this pixel is attached to a feature, the corresponding $REGIST_n^{(t-1)}$ images will each contribute information on q to the assembled image $ASSEM^{(t-1)}$.

This is by itself an improvement over regular interpolation techniques as for example point to point correspondence. One can actually notice that if the ellipsoidal windows used are very elongated in a directional orthogonal to the feature centroid, thus reducing the window to window overlapping regions, the here-before described weighting operation will emulate the point to point correspondence.

A direct consequence of this improvement lies in the vector field extrapolation outside the detected features. For such data, for example beyond centroids 108 and 105 in the example of FIG. 4, no "warping" information is available due to the lack of additional identified feature in these regions of the image. The use of the proximate windows $win(C_n)$ over these features allow to provide information on the correspondence between the images at t−1 and t.

In a subsequent step 41, a temporal integration of the object of interest as well as the background is performed using at least one image from the sequence of assembled images, and one image from the sequence of input image. The results of this step are processed images, also called composite images COMP(t). Through the temporal integration, the intensity of each pixel related to the identified parts is increased while the details of the background are blurred, and the noise reduced.

Figure 2B:
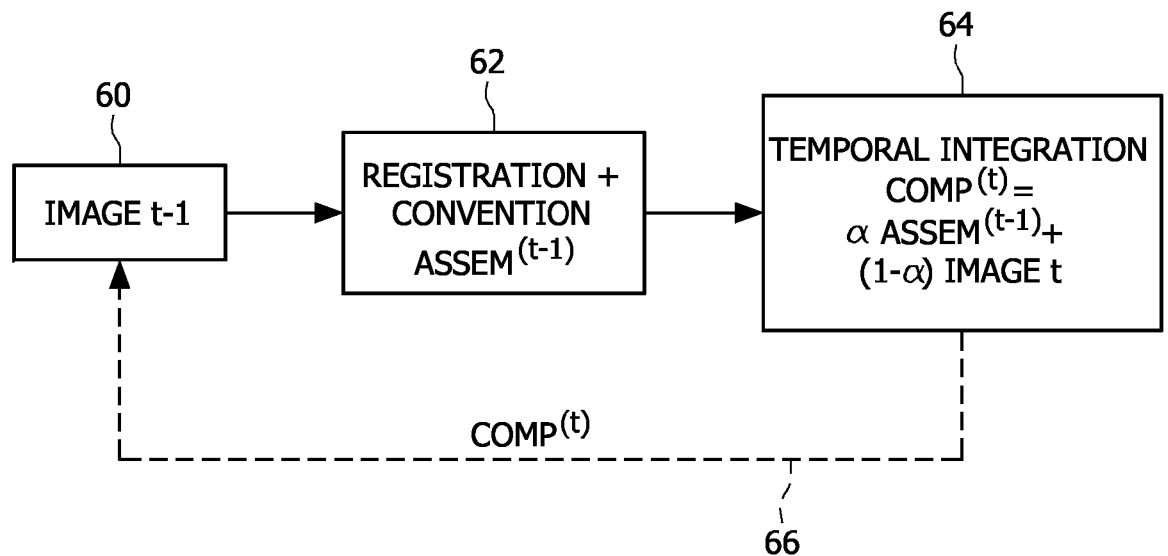

In a preferred embodiment, and represented on FIG. 2B as a functional block, the temporal integration uses the current image M at instant t, and the assembled image determined at instant t−1 ASSEM$^{(t-1)}$. Starting from the image at instant t−1 in step 60, the registration step 14 and the weighted combination step 31 described here above lead to ASSEM$^{(t-1)}$ in step 62. The temporal integration of step 64 is a recursive filter, and uses a weighting factor α∈[0,1] to determine the composite image COMP$^{(t)}$ as a combination of the assembled image ASSEM$^{(t-1)}$ and the current image M$^{(t)}$. The choice of α allows to either focus more on the incoming images or on the previous ones. The resulting combination allows to further enhanced the object of interest, while blurring the background, and reducing the noise. As mentioned before, in ASSEM$^{(t-1)}$, the identified feature parts are respectively synchronized with the same identified parts in M$^{(t)}$. Thus, the temporal integration using these two images allows to add the pixel intensity related to the identified parts, while blurring the pixels related to the background (which are not coherent over these two images) and reducing the noise.

In an alternate embodiment, in order to take into account the processed images and combine them to the current image M$^{(t)}$, the resulting composite image at instant t is reused during the following instant instead of the input image from the acquired sequence (as represented in broken lines in both FIGS. 2A and 2B, and corresponding to step 66 in the later figure). To implement this alternate embodiment, at instant t, the feature part detection of step 11, the registration of parts in step 14, as well as the weighted combination in step 31, are performed using the processed image at the previous time, i.e. the composite image COMP$^{(t-1)}$. The sequence of composite image can be initialized using an image from the sequence of acquired image, the first one for example.

The temporal integration may not be limited to only two images. In an alternative embodiment, the composite image COMP$^{(t-1)}$ may be obtained as the arithmetic mean of a given number $N_{TI}$ of images, $N_{TI}-1$ previously assembled from instants $t-N_{TI}+1$ to t−1, and the current image at instant t. Any weighted combination of a given number of previously assembled images, and the current image, could also be used for that matter. The resulting composite image COMP$^{(t-1)}$ could also be reused, as in step 66 of FIG. 2B, instead of the input image from the acquired sequence.

Using the temporal integration technique, images are more and more improved as the sequence proceeds because the sequence of composite images accumulates the improvements from the registration and weighted combination steps (feature parts are sharper thanks to the generated coherence) and the background is even more blurred (lack of coherence). Indeed, after registration of the identified parts, the background still moves and/or is still very noisy. In other words, the temporal integration step integrates object pixels that correspond to same object pixels in successive images, so that their intensities are increased, while said integration step integrates background pixels that do not correspond to the same background pixels in the successive images, so that their intensities are decreased. The noise is thus reduced.

Hence, the important steps of the method according to the invention are in fact a motion corrected temporal integration (step 41) further reinforced by the weighted combination (step 31), whether these steps are performed in this order, or the opposite. The motion correction, i.e. the registration, is applied to the object of interest and not to the background, which is further faded by the filter kernel applied around each centroid, while the temporal integration is applied both to the object of interest (and its feature parts) and to the background.

In an alternative embodiment according to the invention (not represented on FIG. 2A), the temporal integration step 41 may actually be performed on the registered images of identified parts 15, i.e. before the weighted combination of step 31. This would yield series of composite images, one series for each identified part. The weighted combination 31 would then be performed as described here-before, but on each series of composite images of the separately identified parts.

In the last step of FIG. 2A, the composite images are displayed.

In another embodiment, an enhancement step 21, leading to images of edges 22, can be further added either after the registration of parts (step 14 of FIG. 2A), the weighted combination (step 31) or the temporal integration (step 41), in order to reinforce the edges in the different sequences of images. In case composite images resulting from the temporal integration step are reused in step 14, as described before, they can be enhanced before being reused. In another example, only the displayed composite images are enhanced through step 21.

This invention also provides an apparatus for enhancing objects of interest represented on a moving background in a sequence of noisy images, and for displaying the sequence of enhanced images. The apparatus further comprises acquisition means for acquiring the sequence of images and processing means to implement the method according to the present invention.

This invention may be conveniently implemented using a conventional general-purpose digital computer or micro-processor programmed according to the teachings of the present application. The apparatus is advantageously part of a medical imaging system.

Figure 5:
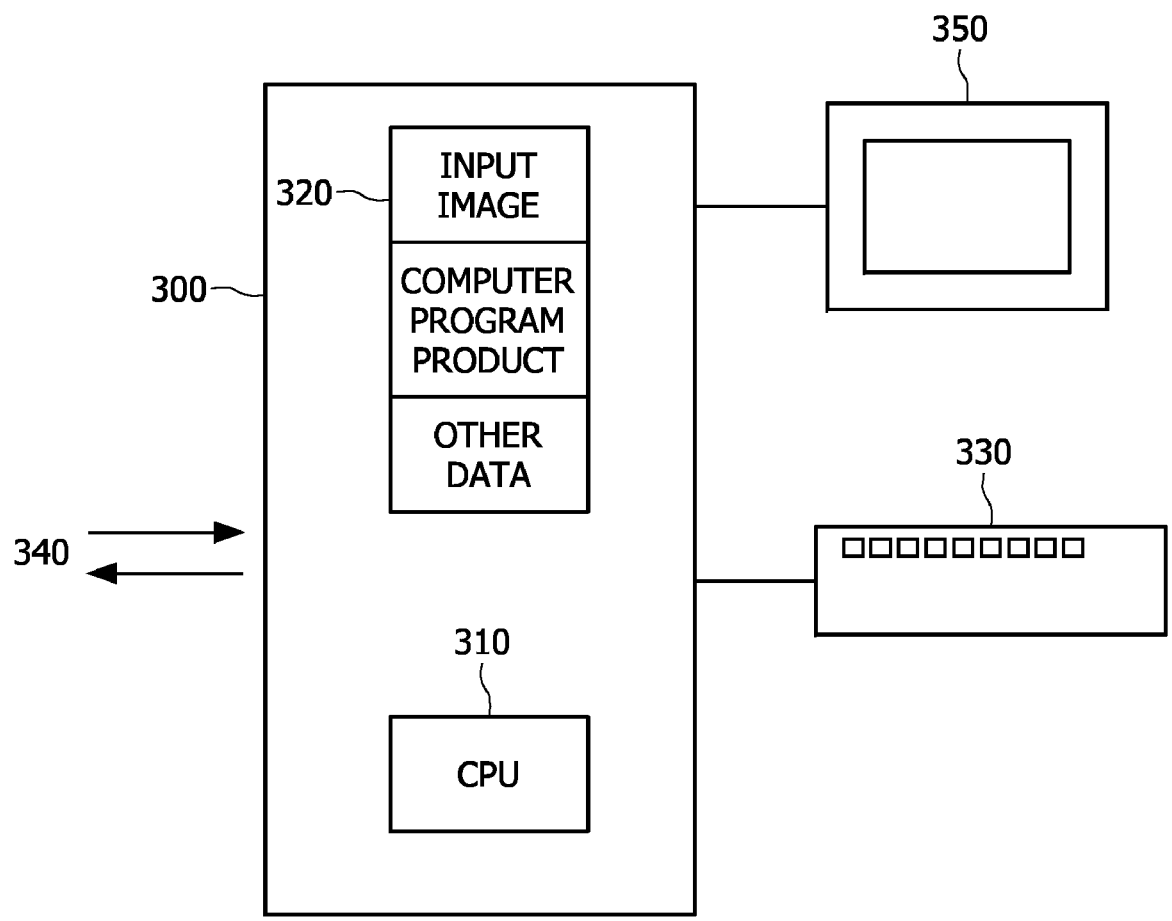

FIG. 5 is a block diagram of a computer system 300, in accordance to the present invention. Computer system 300 can comprise a CPU (central processing unit) 310, a memory 320, an input device 330, input/output transmission channels 340, and a display device 350. Other devices, as additional disk drives, additional memories, network connections . . . may be included but are not represented.

Memory 320 includes a source file containing the input image M, with objects to be enhanced. Memory 320 can further include a computer program product, meant to be executed by the CPU 310. This program comprises instructions to perform the method described here-above. The input device is used to receive instructions from the user for example to select a ROI and/or the landmark locations within the image, and/or run or not different stages or embodiments of the method. Input/output channels can be used to receive the input image M to be stored in the memory 320, as well as sending the composite image (output image) to other apparatuses. The display device can be used to visualize the output image comprising the resulting enhanced objects from the input image.

The invention claimed is:

1. An apparatus for enhancing objects of interest with respect to a background in a sequence of images, said apparatus comprising acquisition means for acquiring the sequence of images and processing means for processing the images, said processing means comprising:

extracting means for extracting features related to an object of interest in images from the sequence of acquired images, said features comprising at least two separately identified parts, registration means, yielding registered images of said identified parts, for registering separately each identified part with respect to an image from the sequence of acquired images, assembling means, yielding assembled images, for assembling together all registered identified parts from said object of interest using a weighted combination of said registered identified parts.

2. The apparatus of claim 1, further comprising temporal integration means for integrating both said identified parts with said background over at least one assembled or registered image, and one acquired image.

3. The apparatus of claim 1, wherein the image from the sequence of acquired image used by the registration means is the current image.

4. The apparatus of claim 3, wherein the at least one assembled image used by the temporal integration means is the assembled image corresponding to the image preceding the current image.

5. The apparatus of claim 4, wherein the acquired image used by the temporal integration means is the current image.

6. The apparatus of claim 5, wherein the temporal integration means yield a composite image as a weighted sum of the assembled or registered image and the current image.

7. The apparatus of claim 6, wherein the extracting means are applied to said composite image.

8. The apparatus of claim 1, wherein the weighting coefficient used in the combination performed by the assembling means are defined over a window centered over each identified part and nil beyond said window.

9. The apparatus of claim 8, wherein said weighting coefficients correspond to a Gaussian filter kernel defined over said window.

10. The apparatus of claim 1, wherein the extracting means are applied to landmarks to allow an indirect localization of said identified parts.

11. The apparatus of claim 1, further comprising enhancing means for enhancing sharp details in images issued from the temporal integration means, the assembling means and/or the extracting means.

12. A medical imaging system, comprising means for acquiring an input image depicting objects of interest, and an apparatus as claimed in any one of the preceding claims for enhancing objects in said input image.

13. A method for enhancing objects of interest represented on a moving background in a sequence of noisy images, said method comprising the steps of:
   acquiring the sequence of images,
   extracting features related to an object of interest on a background in images from the sequence of acquired images, said features comprising at least two separately identified parts,
   registering separately each identified part with respect to an image from the sequence of acquired images, to generate registered images of said identified parts,
   assembling together all registered identified parts from said object of interest using a weighted combination of said registered identified parts, to generate assembled images.

14. A computer program product embodied on a non-transitory computer readable medium, for execution in a processing unit of an image processing apparatus, the computer program product comprising instructions to perform an enhancement method according to claim 13 when the program product is run in the processing unit.

* * * * *